United States Patent Office 3,497,115
Patented Feb. 24, 1970

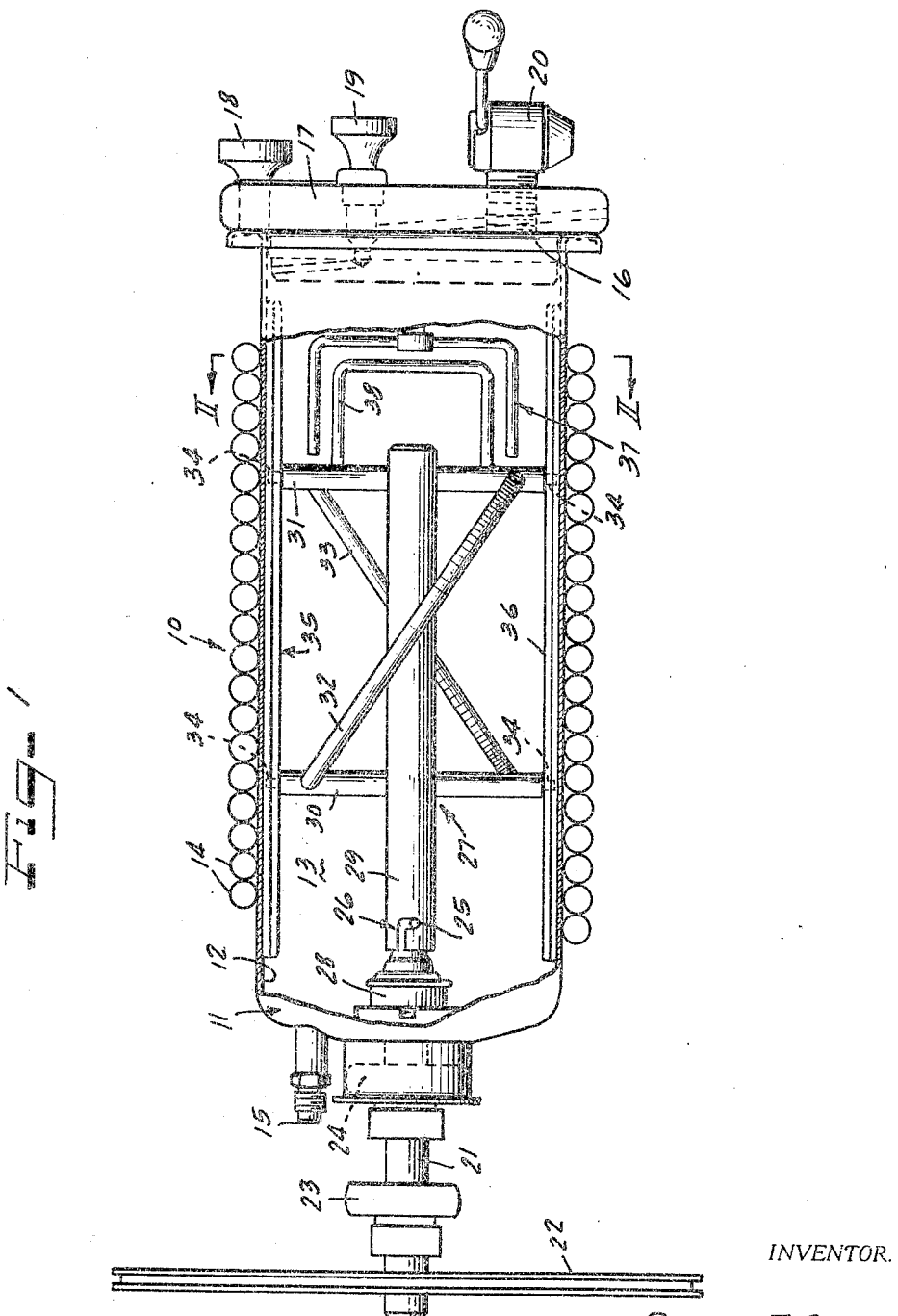

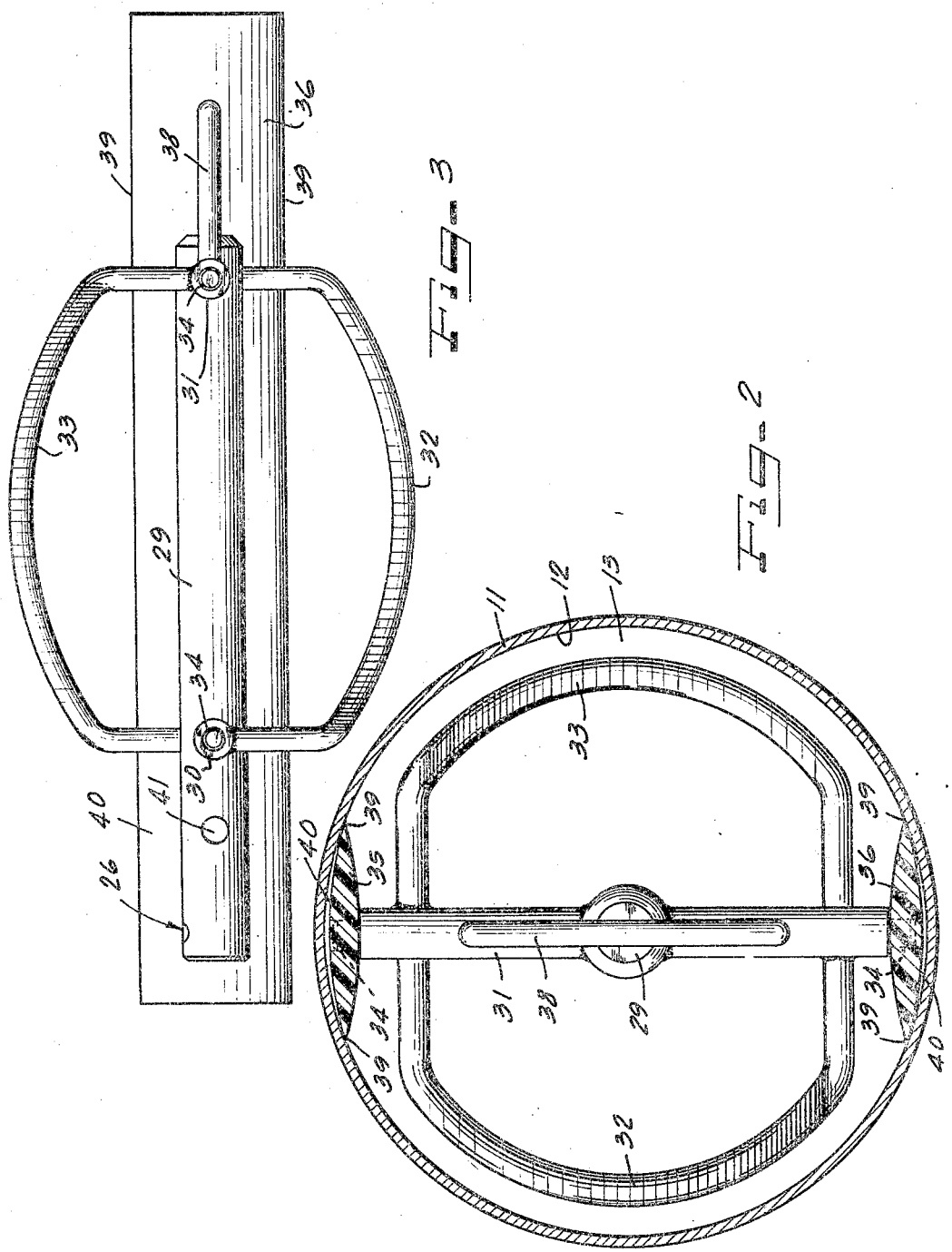

3,497,115
PARTIALLY FROZEN PRODUCT DISPENSING
MACHINE HAVING A SCRAPER ASSEMBLY
Richard T. Cornelius, Minneapolis, Minn., assignor to
The Cornelius Company, Anoka, Minn., a corporation
of Minnesota
Filed Nov. 9, 1967, Ser. No. 681,825
Int. Cl. B67d 3/00
U.S. Cl. 222—544                                 8 Claims

ABSTRACT OF THE DISCLOSURE

A dispensing machine for producing carbonated-slush type of beverage includes a scraper assembly supported as a cantilever within a freezing chamber and carried on a driven shaft, the scraper assembly including stirring means to break up channeling in the product and supporting scraper blades, all moving parts being streamlined in the direction of movement to minimize mixing and hence agitation of the carbonated liquid.

BACKGROUND

This invention pertains to machines for producing and dispensing a carbonated-slush type of beverage, and in particular to a scraper assembly disposed within the freezing chamber of such a machine.

Devices of the general character of that disclosed and claimed herein have been used in ice-cream equipment and in prior slush-ice machines. However, all such prior devices known to me have produced an assortment of problems when applied to the preparation and dispensing of a carbonated-slush type of beverage. Prior devices have included beaters or agitators for fluffing up the product to create overrun, to assure thorough mixing of ingredients, or to promote carbonation in the presence of free carbon dioxide gas. However, when applied to ordinary carbonated beverages, such agitation tends to knock fine particles of ice together to give them a sandy or gritty consistency. Moreover, the liquid portion of the beverage is rendered extremely unstable, and is much like a bottle of soda-pop that has been agitated immediately prior to its being opened. Another problem with prior devices is that they have included wear surfaces through which support is provided. Further, as the product is for human consumption, cleaning must be accomplished regularly, and thus the internal moving parts must be removed for this purpose. This has necessitated the breaking of a seal, a problem which is aggravated where, as here, the device operates under substantial internal pressures, such breaking of the seal oftentimes promoting seal leakage prematurely. Further, prior devices have required relatively high power to rotate them.

SUMMARY OF THE INVENTION

A scraper assembly is provided with a detachable connection within the freezing chamber, a stirrer portion which supports scraper blades, all moving parts being streamlined in the direction of movement, channeling in the product being broken up by the stirrer, the product being urged by the stirrer in a direction away from the direction of flow, the scraper blades being held by centrifugal force against the internal wall of the freezing chamber.

Accordingly, it is an object of the present invention to provide a scraper assembly for the freezing chamber of a carbonated-slush type of beverage dispensing machine.

Another object of this invention is to provide a scraper assembly which agitates the product as little as possible.

A still further object of the present invention is to provide a scraper assembly which breaks up channeling within such product.

Yet another object of the present invention is to provide a scraper assembly which may be readily removed without breaking any shaft seal.

A still further object of the present invention is to provide a scraper assembly having no wear surfaces by which it is supported.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 1 is a side elevational view, partly in cross section, of a freezing chamber of a carbonated-slush type of beverage dispensing machine, provided in accordance with the principles of the present invention.

FIG. 2 is an enlarged cross-sectional view taken generally along line II—II with some parts omitted.

FIG. 3 is an enlarged view of the scraper assembly shown in FIG. 1, as seen from above, with one scraper blade omitted.

AS SHOWN ON THE DRAWINGS

The principles of this invention are particularly useful when embodied in a carbonated-slush type of beverage dispensing machine, a portion of which is shown in FIG. 1, generally indicated by the numeral 10. The dispensing machine 10 includes a housing 11 having a cylindrical internal surface 12 that defines a cylindrical freezing chamber 13. The housing 11 is surrounded by a series of refrigerant coils 14 which are connected to a conventional refrigeration system (not shown) to provide a directly refrigerated zone which lies within the axial extent of the refrigeration coil 14.

The housing 11 has a beverage inlet 15 through which liquid carbonated beverage is introduced. The opposite end of the housing 11 is flanged as at 16, and is normally closed by a faceplate 17 which can be readily removed after removal of a set of nuts, one of which is illustrated at 18. A manual bleed valve 19 enables all gas to be removed from the interior of the chamber 13, while a manually controlled dispensing valve 20 enables the finished product to be withdrawn or dispensed from the end of the chamber 13 which is opposite to the inlet 15.

A shaft 21 is rotatably driven by a pulley 22 corotatably secured thereto, the rotatably driven shaft 21 being supported by a pair of self-aligning bearings 23, 24, the support for which is conventional and needing no explanation. The rotatably driven shaft 21 extends to the interior of the chamber 13 and is provided with a radially projecting pin 25 that forms part of a bayonet connection generally indicated at 26 between the rotatably driven shaft 21 and a scraper assembly 27. As the chamber 13 is pressurized, there is provided a pressure-tight seal 28 which acts between the rotatably driven shaft 21 and the housing 11. The bayonet connection 26 is thus disposed within the chamber 13 and provides cantilever support for the scraper assembly 27.

The scraper assembly 27 includes a support shaft 29 to which there is secured a plurality of stirrers, each lying in a plane transverse to the rotational axis of the support shaft 29.

The stirrers include a pair of arms or radially extending rods 30, 31 which extend radially from the support shaft 29 in diametrically opposite directions. Where the arms 30, 31 are formed as rods, the juncture with the support shaft 29 is closed by a smooth weld to make the connection entirely sanitary at both sides of the support shaft 29. The stirrers further include a pair of mixing rods 32, 33 each having a configuration which is approximately that of half an oval, with the ends thereof joined by sanitary welds to the arms 30, 31. The rod 32 is thus secured to both of the arms 30, 31, and the rod 33 is also secured to both of the arms 30, 31. As stated above, both of the rods 32, 33 lie in planes that are transverse to the rotational axis of the support shaft 29. That plane, in the instance of each of the rods 32, 33, is so inclined that rotation of the scraper assembly causes the leading surfaces of the rods 32, 33 to tend to cam some of the product in a direction which is generally opposite to that taken by the product in flowing from the inlet 15 to the outlet 20. To be more specific, the rotatably driven shaft 21 as shown in FIG. 1 rotates in a clockwise direction if viewed from the left end. This insures positive engagement of the bayonet connection 26, and the more forward rod 32 moves in what appears to be a downward direction, thereby camming some product to the left, away from the outlet 20. The more distant rod 33 would at the same moment be moving upwardly and hence producing a similar effect.

The stirring means 30, 31 has reduced pin-like formations 34 at their outer ends which are received in apertures in a pair of oppositely disposed scraper blades 35, 36. The pin-like projections 34 have a rather loose fit with the blades 35, 36 so that the blades are free to move radially outwardly due to centrifugal force, the rotatably driven shaft typically being driven at a speed of about 100 r.p.m.

All of the moving parts of the scraper assembly 27 are streamlined in the direction of movement, including the support shaft 29, the stirrers 30–33, and the scraper blades 35, 36. The stirrers 30–33 are each of round cross-section and are thus streamlined as the term is here used. By this smooth configuration, a minimum of agitation or mixing is achieved.

In operation, slush-ice forms in the directly refrigerated zone defined by the refrigeration coils 14. The blades 35, 36 have an axial extent as great as this directly refrigerated zone so that frost deposited on the internal surface 12 is readily removed.

The carbonated product is thus under pressure which is derived from the source of product connected to the inlet fitting 15. When the valve 20 is opened, the pressure within the chamber 13 drops to almost atmospheric pressure. Under this condition of no pressure, agitation of the product would cause it to break up and cause the liquid carbonic acid to separate into its gaseous $CO_2$ and liquid water components. However, with the streamlining that is provided in this invention, even with the dispensing valve open for the few seconds that it takes to withdraw a drink, and with the scraper assembly continually rotated, there is still no appreciable breakout of gaseous carbon dioxide gas due to such scraper assembly rotation.

One of the reasons why the scraper assembly 27 should be continually rotated is that in the absence of such rotation, while beverage is being withdrawn through the dispensing valve 20, there would be a tendency for fresh unfrozen product entering the inlet 15 to create a channel through the slush, along the path of least resistance and directly to the dispensing valve 20, thereby producing a virtually untreated serving of the beverage. The rotation of the stirrers 30–33 breaks up any channels which form during the dispensing. Since true mixing is not desired, the stirrers are disposed only at an axially central portion of the directly refrigerated zone, the stirrers thus being axially spaced inwardly from the ends of the directly refrigerated zone defined by the coil 14. This spacing of the stirrers inwardly from the ends of the directly refrigerated zone further minimizes agitation or mixing per se.

In accordance with another of my inventions, not claimed herein, I provide a viscosity sensing element generally indicated at 37 which can pivot a few degrees in one direction because of a spring bias, and in an opposite direction against such bias because of torque imparted thereto by the viscosity of the slush-ice beverage. As a part of that invention, I provide a U-shaped rod 38 secured to the arm 31 in the same manner as the rods 32, 33 to serve as a thrust impeller to the viscosity sensing element 37. The thrust impeller is believed from experience to have little or no mixing or agitating effect, on carbonation stability.

As shown in FIGS. 2 and 3, the scraper blades 35, 36 have elongated spaced parallel edges 39, 39 which come substantially to a point or relatively sharp edge. The blades 35, 36 comprise molded plastic having good bearing and lubricity properties, such as nylon. Further, each of the blades has a curved outer surface 40, 40 which has a radius of curvature that is larger than the radius of curvature which defines the inner cylindrical surface 12 of the housing 11. Because of this arrangement, both of the edges 39 can engage the surface 12. The leading edge does the scraping, and the trailing edge serves to hold the blade in the right attitude. The blades 35, 36 are symmetrical so that either side thereof can be the outer surface, and can be turned end-for-end so that either edge 39 can be the leading surface. By this feature, not only is ease of assembly provided, but a long life is assured. Moreover, any wear that might take place on the blades because of friction with the inner surface 12 of the housing 11 would tend to sharpen them.

As shown in FIG. 3, the support shaft 29 may be provided with an aperture 41 for access to the end of the driven shaft 21 if the same should stick.

Because of the very gentle stirring and the low friction of the scraper blades, very little input power is needed. In fact, the scraper blades act more in the nature of wipers. I have found that less than $\frac{1}{40}$ horsepower can operate this device, and a substantial portion of that energy is used up by friction in the bearings 23, 24 and the seal 28. So little mechanical energy is put into the product that this device does not render it unstable, even with the dispensing valve 20 open. Thus the scraper assembly can operate continually during dispensing to preclude channeling and also to keep the torque sensing mechanism "on" during dispensing. When the pressure and temperature of the product have been experimtally placed in conditions which are borderline with respect to the possibility or likelihood of gas break-out taking place, none has been observed. With this invention, there is virtually no tendency for the fresh product that is entering the inlet 15 to mix with the ready product in the chamber 13, and almost the entire contents of the chamber 13 can be dispensed without fresh product, not yet frozen, reaching the dispensing valve 20, and without the fresh product serving to dilute the ice content of the ready product being dispensed. Moreover, there is so little agitation that the particle size of ice does not increase. In fact, the crystal growth will not take place even though the device has been operating several hours without any dispensing taking place.

Although various minor modifications might be suggested by those versed in the art, it should be understood that I wish to embody within the scope of the patent warranted hereon all such embodiments as reasonably and properly come within the scope of the claims which follow.

I claim as my invention:

1. A scraper assembly for being attached to a rotatably driven shaft, said driven shaft being horizontally disposed in and extending along the center of a cylindrical freezing chamber of a machine for dispensing a partially frozen product, comprising;

(a) a separate support shaft having a length for extending further along the center of said cylindrical chamber and having a connection for being detachably concentrically secured to the driven shaft within the chamber, said connection being arranged to support said support shaft horizontally as a cantilever and to provide the sole support for said suport shaft;
  (b) at least one stirrer fixedly secured to, projecting radially from, and supported solely by said support shaft; and
  (c) at least one scraper blade loosely carried by said stirrer for engaging the interior of the chamber.

2. A scraper assembly according to claim 1, wherein said support shaft, said stirrer, and said scraper blade are streamlined in the direction of rotation to minimize agitation of the partially frozen product.

3. A dispensing machine for dispensing a partially frozen product, said machine including:
  (a) a housing having an internal surface defining a cylindrical freezing chamber arranged to be externally refrigerated;
  (b) a rotatably driven shaft horizontally supported by bearings external to said housing, said driven shaft projecting through a pressure-tight seal into and along the center of said chamber;
  (c) a separate support shaft having a length for extending horizontally further along the center of said cylindrical chamber and having a connection detachably concentrically secured to said driven shaft within said chamber, said connection supporting said support shaft as a cantilever and providing the sole support for said support shaft;
  (d) at least one stirrer fixedly secured to, projecting radially from, and horizontally supported solely by said support shaft; and
  (e) at least one scraper assembly loosely carried by said stirrer and engaging the interior of said chamber.

4. A dispensing machine according to claim 3, wherein said support shaft, said stirrer, and said scraper blade are streamlined in the direction of rotation to minimize agitation of the partially frozen product.

5. A dispensing machine according to claim 3, having:
  (a) a product inlet at one end of said chamber; and
  (b) a faceplate having a dispensing valve normally closing the other end of said chamber;
  (c) said stirrer having a surface which is so directed that said surface directly engages and moves product in a direction away from said faceplate in response to rotation thereof.

6. A dispensing machine according to claim 3, wherein said scraper blade has a curved surface adjacent to said internal surface of said cylindrical chamber extending between elongated spaced parallel scraping edges, the radius of curvature of said blade exceeding the radius of curvature of said cylinder to enable both of said edges to engage said cylinder.

7. A dispensing machine according to claim 3, wherein said blade extends along the entire axial extent of the directly refrigerated portion of said freezing chamber, and wherein said stirrer has an extent in the direction of said length which is spaced axially inwardly from the ends of the directly refrigerated portion to provide a central product zone free of any channeling.

8. A dispensing machine for dispensing a partially frozen product, said machine including:
  (a) a housing having an internal surface defining a cylindrical freezing chamber arranged to be externally refrigerated, said housing having a product inlet and a product outlet at opposite ends of said chamber;
  (b) a rotatably driven shaft horizontally supported by bearings external to said housing, said driven shaft projecting through a pressure-tight seal into and along the center of said chamber;
  (c) a separate support shaft having a length for extending further along the center of said cylindrical chamber and having a connection detachably concentrically secured to said driven shaft within said chamber, said connection supporting said support shaft horizontally as a cantilever, and providing the sole support for said support shaft;
  (d) means fixedly secured to and supported solely by said horizontal support shaft and extending radially toward said internal cylindrical surface, and disposed within an axially central portion of the externally refrigerated part of said chamber for breaking up any channeling of product flowing from the inlet to the outlet; and
  (e) at least one scraper blade loosely carried by said means and having an edge slidably engaging the interior of the chamber.

References Cited

UNITED STATES PATENTS

| | | | |
|---|---|---|---|
| 1,309,175 | 7/1919 | Becht | 62—342 |
| 2,810,557 | 10/1957 | Phelan | 63—342 X |
| 3,194,385 | 7/1965 | Barnese | 222—413 X |
| 3,269,611 | 8/1966 | Komarek | 222—413 X |

SAMUEL F. COLEMAN, Primary Examiner

N. L. STACK, Assistant Examiner

U.S. Cl. X.R.

222—146